Sept. 19, 1944.  L. E. SODERQUIST  2,358,762
VULCANIZING PRESS
Filed June 5, 1942  3 Sheets-Sheet 1

INVENTOR
LESLIE E. SODERQUIST

BY

ATTORNEYS

Sept. 19, 1944.  L. E. SODERQUIST  2,358,762
VULCANIZING PRESS
Filed June 5, 1942  3 Sheets-Sheet 2
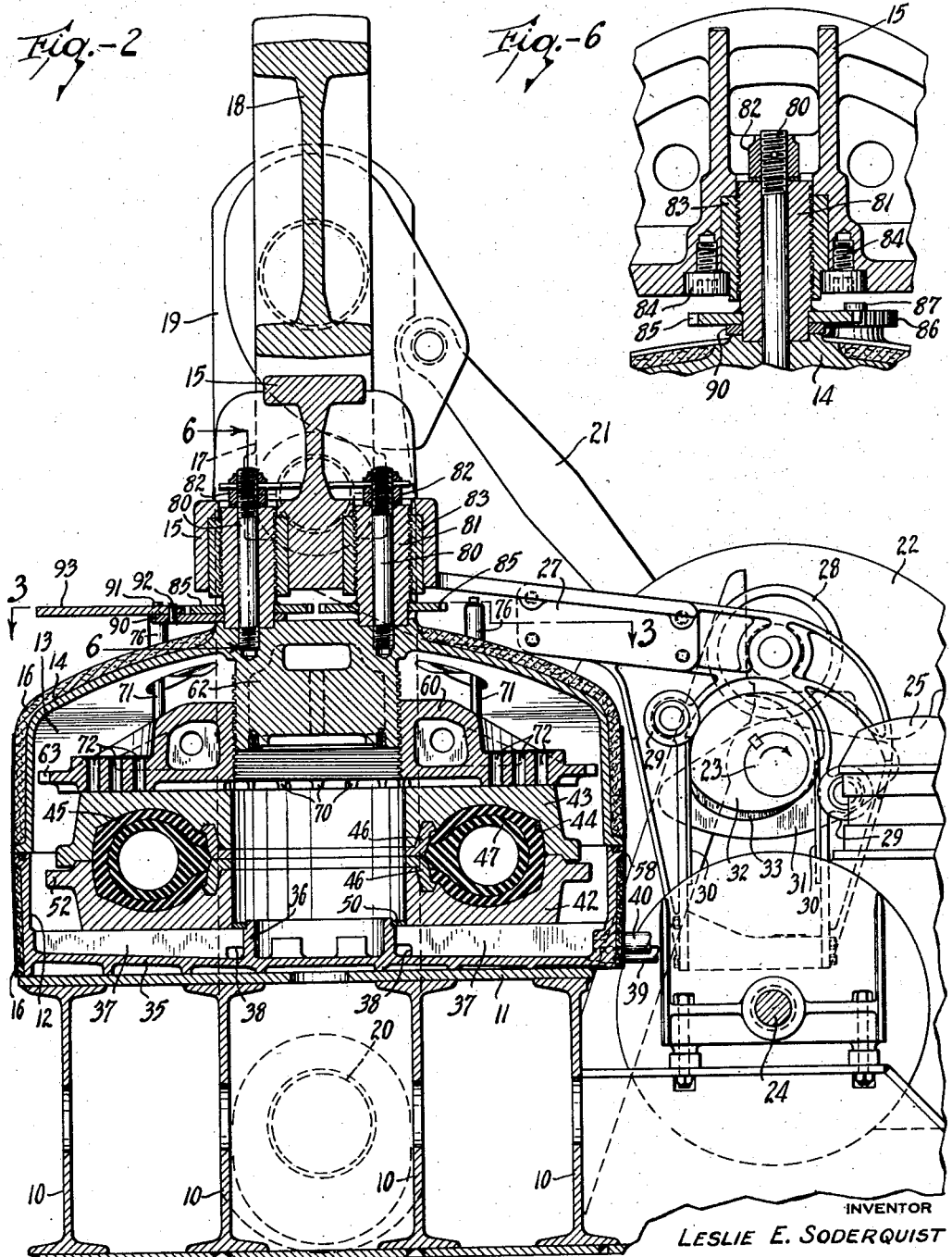
INVENTOR
LESLIE E. SODERQUIST
BY
ATTORNEYS Sept. 19, 1944. L. E. SODERQUIST 2,358,762
VULCANIZING PRESS
Filed June 5, 1942 3 Sheets-Sheet 3
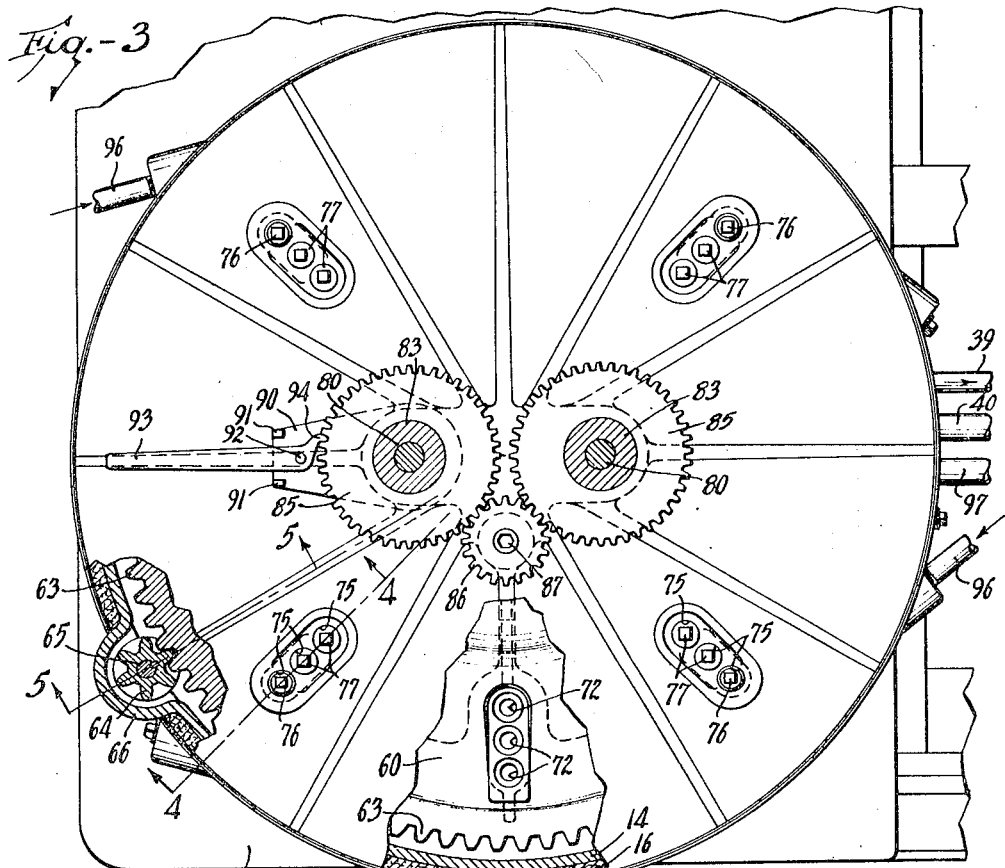
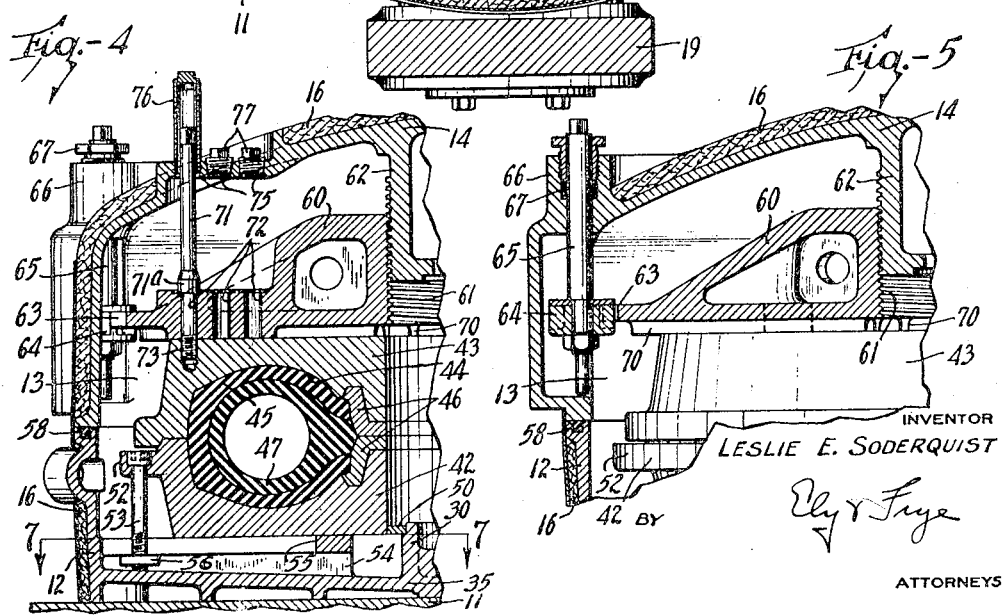
INVENTOR
LESLIE E. SODERQUIST
ATTORNEYS Patented Sept. 19, 1944

2,358,762

UNITED STATES PATENT OFFICE 2,358,762

VULCANIZING PRESS

Leslie E. Soderquist, Akron, Ohio, assignor to The McNeil Machine & Engineering Company, Akron, Ohio, a corporation of Ohio Application June 5, 1942, Serial No. 445,922

12 Claims. (Cl. 18—17)

This invention relates to improvements in vulcanizing presses, and more especially it relates to presses which are adapted for use in the vulcanization of pneumatic tires.

The press of this invention may be of the individual type, wherein a tire is vulcanized between upper and lower heated mold sections, or of the twin or dual type wherein two individual molds are operated together side by side as a single unit.

This invention is a modification of the press structure disclosed in my Patent No. 2,259,430, granted October 14, 1941, and has for one of its objects the provision of a press of the individual or dual type in which mold sections of various sizes may be alternatively employed and in which proper adjustments may quickly be made to accommodate the press to different sizes of molds therein.

In many tire plants, the individual and dual type of press has supplanted the old style pot heater, and it has been quite a problem in these plants to make use of the mold sections which were used with the pot heaters. In my patent, previously referred to, there is disclosed one way in which these pot heater molds may be utilized in individual and dual type presses, and the present invention discloses another way to make use of these pot heater molds, whereby substantial savings will result in these tire plants.

Another object of this invention is to provide improved means to insure a proper fit of the mold sections in the press, which means are capable of regulation to accommodate mold sections of different sizes.

A further object is to provide regulating and adjusting means for the mold sections which may be operated from outside the curing chamber in which the mold sections are located.

Further objects are to provide novel means for securing the mold sections in the curing chamber; and to provide for a novel circulation of steam or other curing medium in the chamber.

Other objects and advantages will become manifest from the following description taken in conjunction with the accompanying drawings of which:

Fig. 2 is a section, on a larger scale, taken substantially on line 2—2 of Fig. 1 with some parts broken away and shown in elevation;

Fig. 3 is a section on a larger scale, taken substantially on line 3—3 of Fig. 2 with some parts broken away and shown in elevation;

Figure 7:
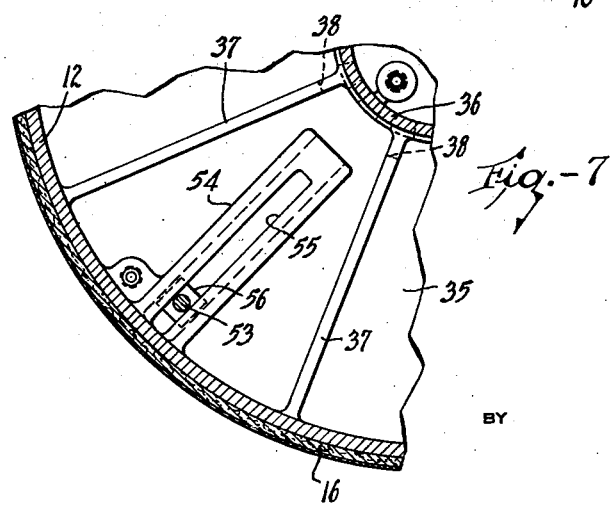

Figs. 4 and 5 are fragmentary sectional views taken substantially on lines 4—4 and 5—5 respectively of Fig. 3;

Fig. 6 is a fragmentary section on a larger scale, taken substantially on line 6—6 of Fig. 2; and Fig. 7 is a fragmentary section taken substantially on line 7—7 of Fig. 4.

Referring to the drawings the numeral 10 designates a plurality of I-beams or the like upon which a base plate 11 is suitably supported. In a dual press of the type shown in Fig. 1, the latter plate has secured thereto in any suitable manner, a pair of lower annular cuplike shell members 12, and cooperating with members 12, to form a pair of curing chambers such as the chamber 13, Fig. 2, is a pair of movable upper annular shell members 14, which are adjustably secured to cross-heads 15 in a manner to be described. In an individual type of press there would, of course, be only one lower shell member and one upper shell member, as will be understood. In Figs. 2 to 7 the structure shown will be described in connection with but one set of shell members 12 and 14, the same constituting a vulcanizer unit. Exteriorly the vulcanizer shells 12, 14 are covered with suitable thermal insulation 16 to conserve the heat of the vulcanizing fluid employed therein. The two cross-heads 15 are pivotally mounted, on a common horizontal axis, in respective pairs of ears 17, 17 that project downwardly from the under side of a beam 18 that spans both vulcanizer units of the press. The beam 18 is pivotally mounted at the upper ends of a pair of links 19, 19 that are located at opposite sides of the press, the lower ends of said links being pivotally carried upon suitable stub-shafts 20, 20.

Figure 1:
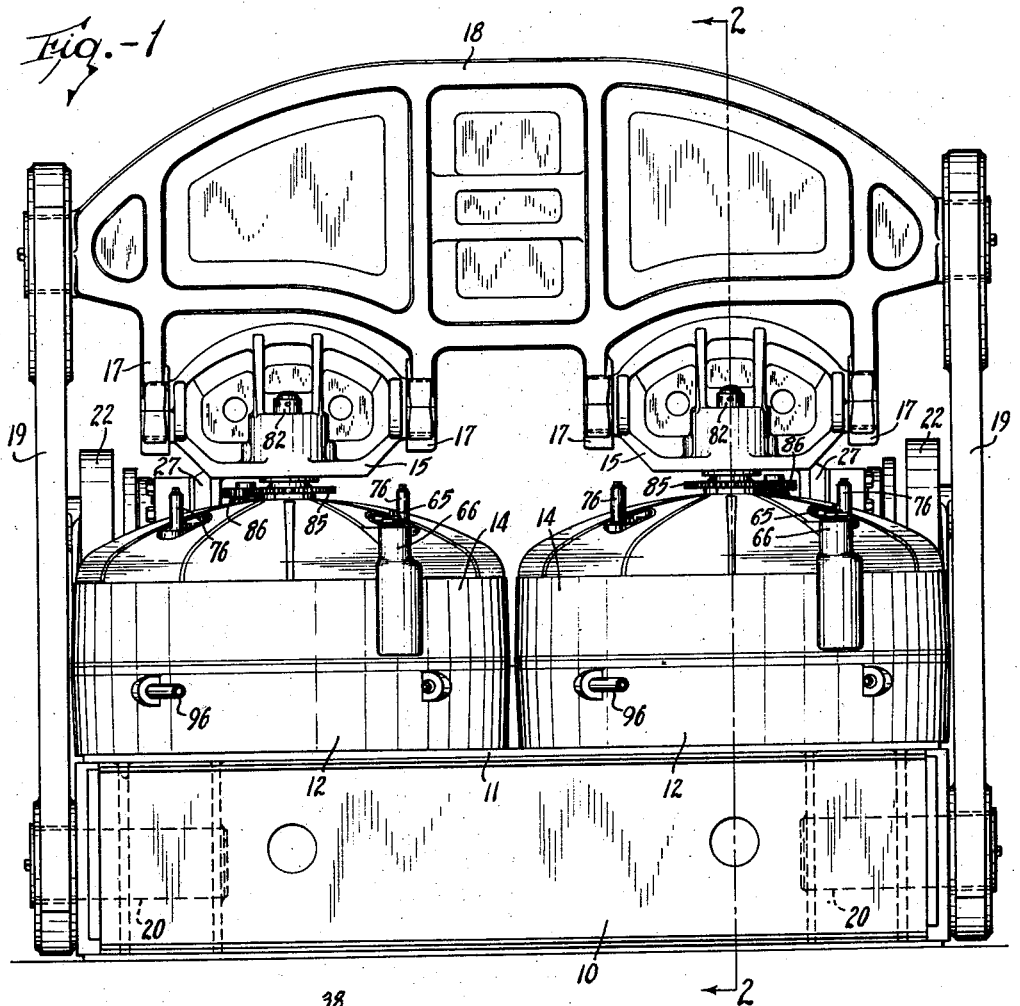
Fig. 1 is a front elevation of a twin or dual press embodying the features of the invention.

The press shown is of the type known as a "stripping press," that is, wherein articles molded and vulcanized within each unit of the press are stripped or loosened from their molds during the opening of the press. This is effected by causing the mold sections first to separate a short distance while remaining in parallelism, then to cause one of the mold sections to move relatively of the other mold section in a direction that is transverse to the opening movement of the mold, to deform and loosen the article in the mold, before moving the mold to fully open position. To this end each link 19 has one end of an arm 21 pivotally connected thereto near its upper end, the other end of said arm being pivotally connected eccentrically to a rotary member, specifically a gear, (not shown) that is enclosed within a gear housing 22. As shown in Fig. 1 there are two of the latter, and the gears therein are mounted upon opposite ends of a driven shaft 23, Fig. 2. The shaft 23 is suitably driven from a countershaft 24, and the latter is driven by means of a motor 25. The arrangement is such that driving of the motor 25 effects a tilting of the links 19 and thereby moves the beam 18.

Concurrently with the moving of the beam 18 as described, the cross-heads 15 are tilted relatively of the beam, and for effecting such tilting each cross-head has an arm 27 fixedly secured thereto and extending rearwardly therefrom. At its rear end, shown in Fig. 2, each arm 27 carries a plurality of cam rollers 28, 29, 29 and cam surfaces 30, 30 which cam rollers and surfaces are engaged by respective cams 31, 32, and 33, the cams being mounted upon the shaft 23. The arrangement is such as to impart to the cross-heads 15 and upper vulcanizer shell 14, during th opening of the press, the peculiar movement hereinbefore described that causes the mold sections within the press automatically to strip the work from the molding surfaces of the molds. This feature, however, is not a part of the present invention and for that reason it is thought that the foregoing brief description will be sufficient.

Referring now to Figs. 2 to 7 showing a single vulcanizer unit in detail, it will be seen that the lower vulcanizer shell 12 is formed with a bottom wall 35, and rising therefrom, interiorly of the shell and concentric with the axis thereof is an annular flange 36. The bottom 35 also is formed with a plurality of radial ribs or webs 37, 37 that are united at their inner ends with the flange 36 and at their outer ends with the peripheral wall of the shell, said ribs being of less height than the flange 36, and dividing the base into a plurality of sectors. In one of said sectors, shown at the right in Fig. 2, the bottom 35 slopes downwardly from the flange 36 to the peripheral wall of the shell. In all other sectors the bottom 35 slopes downwardly toward the flange 36. Each rib 37 has its end nearest the flange 36 formed with an aperture 38, the arrangement being such that water of condensation forming in any sector will flow by gravity to the single sector in which the bottom slopes downwardly to the peripheral wall of the shell, and will collect at the lowest point in said single sector. A drain pipe 39 is threaded through the wall of the shell 12, in the region of the lowest part thereof, for removing said water of condensation. The shell also may be penetrated in this region by the pipe 40 of a temperature recorder.

The upper margins of the ribs 37 are all located in the same horizontal plane, said ribs constituting a support for the lower section 42 of an annular, two-part mold of which 43 is the separable mating upper mold section. The mold is of the type that previously has been used in a pot heater for effecting vulcanization of an article in the mold. As shown herein, the mold is of the kind employed in the manufacture of pneumatic tire casings, the two mold sections defining an internal annular cavity 44 in which is received a tire casing 45 and a pair of metal bead rings 46, 46 engaging the bead portions of said tire. In the case of a self-stripping press these bead rings will be attached to their respective mold sections. An expansible core 47 is mounted in the tire 45, and is distended by suitable heated fluid under pressure during the vulcanizing operation to force the tire structure into every region of the molding cavity, as is well known practice in the art. The usual piping connections to the expansible core are omitted as unnecessary to the operation of this invention.

The lower mold section 42 is positioned concentrically of the axis of the vulcanizer by means of the flange 36 which is of such height as to extend into the axial opening of the mold section. In the case of smaller molds, the flange 36 will engage the surrounding circumferential face of the mold. In the case of larger molds where the inside diameter of the mold is larger than the outside diameter of the flange, an annular adapter ring 50 of proper radial width is employed to fill the space between the mold and flange, as shown in Fig. 2.

In order that the engraving in the cavity of each mold section always will register accurately with the engraving in the cavity of the other mold section, it is necessary to secure the mold sections in determinate fixed positions so that one section cannot turn accidentally, relatively of the other mold section. To this end the lower mold section 42 is bolted to the bottom of the shell 12. As shown in the drawings, the mold section 42 is formed with a flange 52, and this flange is bored and counterbored at a plurality of spaced points (usually four in number) to receive respective downwardly extending cap screws 53. At similarly spaced points the bottom 35 of the shell 12 is formed with radially extending structures 54, the top faces of whch are in the same plane as the tops of the ribs 37. Each structure 54 has its top formed with a longitudinally extending slot 55, the latter being extensively undercut below the top of the structure so as to receive and retain a nut 56. By registering each screw 53 with a slot 55 and threading said screw into a nut 56, the lower mold section readily is secured against angular movement. The arrangement is such that mold sections of any diameter are mountable in the vulcanizer shell in this manner.

The upper circumferential margin of the vulcanizer shell 12 is provided with a lip gasket 58 adapted to make sealed connection with the confronting lower margin of the upper vulcanizer shell 14, in the closed condition of the press, to prevent leakage of vulcanizing fluid from the chamber 13.

For mounting the upper mold section 43 in the vulcanizing chamber 13, for movement relatively of the lower mold section 42 during the opening and closing of the press, an annular platen or adapter 60 is provided, the inner circumference of which is formed with female screw threads 61. The platen is secured to an axial boss 62 that is formed on the concave side of the upper shell 14, said boss being exteriorly formed with screw threads that are engageable with the threads 61 of the platen. The arrangement is such that when the platen is turned angularly upon the supporting boss 62, it is also moved axially. By this means the upper mold section 43, which is attached to said platen in a manner presently to be described, is adjusted from or toward the lower mold section 42 to assure proper mating of the mold sections. For turning the platen 60 angularly about its axial support, said platen has its perimeter formed with a ring gear 63, the teeth of which mesh with a pinion 64 that is keyed to a vertical stub shaft 65. The latter is journaled at its upper end portion in the vulcanizer shell 14, and extends through a boss 66 to the exterior of said shell where its projecting upper end is squared to receive a suitable turning tool such as a crank or wrench (not shown). There is a stuffing box 67 in the boss 66 to prevent the escape of vulcanizing fluid along the shaft 65. The teeth of the pinion 64 are shrouded as shown so that any substantial axial movement of the platen 60 and ring gear 63, as the result of the threaded support of the platen, will move with it pinion 64 and its stub shaft 65, with the result that gear and pinion are in mesh at all times. In the event that the mold sections 42, 43 are substantially thicker or thinner than shown, a shaft 65 of different but appropriate length readily is substituted for the one shown.

As previously stated, the upper mold section is secured to the bottom of the platen 60, and the bottom face of the latter is formed with a plurality of radial ribs 70, 70 against which the mold section bears, the arrangement enabling vulcanizing fluid to pass between the platen and the mold section whereby superior heat transfer to the latter is achieved. The mold section 43 is secured to the platen 60 by means of four elongated screws 71, 71 that extend through respective countersunk bores 72 in the platen and are threaded into suitable tapped recesses, such as the recess 73, Fig. 4, in the top face of the mold section. Intermediate their ends the screws 71 are formed with respective shoulders or flanges 71a that serve the same purpose as the head of an ordinary screw. The bores 72 are arranged in series of threes, there being eight of such series arranged at equally spaced points around the platen. The three bores 72 of each series are disposed side by side in a plane that extends radially of the platen. There are but four tapped recesses 73 in the top of mold section 43, and in the illustrated embodiment of the invention shown the recesses 73 are alignable with the radially outermost bores 72 of alternate series of such bores in the platen such aligning being effected by rotation of the platen. If molds smaller than that shown are used in the press, the recesses 73 may be alignable with either of the other two bores 72 of each series of such bores in the platen. The recesses 73 are in the same radial planes as the bores in mold section 42 that receive the bolts 53, when the mold sections are properly positioned angularly of each other, and such proper angular positioning may be achieved by use of the usual registering dowels (not shown).

The screws 71 are arranged to be manipulated from the outside of the press, and to this end the vulcanizer shell 14 is apertured to enable said screws to extend therethrough. Said apertures, designated 75, are arranged in series of threes, there being four of such series arranged at equally spaced points about the axis of the shell, in the top thereof as shown in Fig. 3. The apertures 75 are the same distance from the axis of the vulcanizer as are the bores 72, thus enabling said apertures and bores to be brought into axial alignment, and the series of apertures 75 are disposed in the same radial planes as the slots 55 aforementioned. The apertures 75 are of sufficiently large diameter to enable the flange 71a of the screws 71 to pass therethrough, so that the coupling of the mold section 43 to the platen may be effected while the vulcanizer shell is closed. The upper end of each screw 71 is squared as shown to receive a suitable crank or wrench (not shown). The apertures 75 are internally threaded, and a tubular closure member 76 is mounted over the projecting upper end portion of each screw 71 and threaded into the aperture 75 thereof to prevent escape of vulcanizing fluid at these points. For the same reason suitable plugs 77 are threaded into the other apertures 75. The arrangement is such that by removing the screws 71 the platen 60 is enabled to be turned angularly relatively of the mold section 43.

In the setting up of the press with mold sections 42, 43 therein it is of primary importance that said sections are fully closed in the operative condition of the press in order to assure proper molding and to prevent the overflow of material from the mold. Furthermore, it has been found that the attainment of this object is best achieved by the provision of means whereby the upper shell 14 and elements carried thereby may be moved as a unit relatively of the cross-head 15 that carries them. To this end the top of the vulcanizer shell has two parallel spindles 80, 80 threaded thereinto and rising therefrom. Journaled on said spindles are respective screws 81 the lower ends of which are received in shallow counterbores in the top of the shell 14, the screws being retained on said spindles by respective lock nuts 82 that are threaded onto the upper end portions of the spindles and which bear against suitable thrust bearings on the upper ends of the screws. Said screws 81 are threaded into respective nuts 83 that are mounted in cylindrical bores in the cross-head 15, each of said nuts being restrained against axial and angular movement by a pair of set screws 84 that are threaded into the cross-head and have heads that engage flatted regions formed on the nuts at the lower end thereof. The lower end portion of each screw 81 is unthreaded, and fixedly mounted on said unthreaded portion is a gear 85. The two gears 85 do not mesh with each other, but mesh with an intermediate idler gear 86 that is journaled on a stub shaft 87 mounted on the top of the shell 14. The arrangement is such that rotation of one gear 85 effects concurrent rotation of the other gear 85, in the same direction, to turn the screws 81 and thereby to move the latter axially of the nuts 83, whereby the shell 14 and elements carried thereby are moved toward or away from the cross-head 15.

For rotating the gears 85, one of the screws 81 has a radially extending arm 90 journaled thereon, on its unthreaded region below the gear 85. The free end of the arm 90 is squared, and at the corners thereof is formed with respective upstanding abutments or lugs 91, 91. Intermediate the lugs 91 and radially inward therefrom the arm 90 carries an upstanding pivot pin 92, and removably pivoted on the latter is a lever arm 93. The lever arm 93 is formed adjacent its pivot with a dog 94, which, when the lever arm is turned in one direction, enters between two teeth of the gear 85 to rotate the latter through an arc substantially less than 360 degrees. The dog is withdrawn from the gear teeth when the lever arm is turned in the opposite direction, and the lever arm then engages a lug 91 so that the lever arm and the arm 90 move backward together. Turning of the gear 85 effects adjustment of the screws 81 as previously described. By inverting the position of the lever arm on the arm 90, the gears 85 may be turned in the opposite direction.

The mounting of a mold in the press is achieved in the following manner. With the press empty, the upper shell 14 is adjusted axially, relatively of the cross-head 15, until there is a space of about $\frac{1}{32}$ inch between the confronting margins of the shells 12, 14 when the press is closed. The press is then opened and a closed mold is placed therein, the lower mold section 42 being secured to the lower shell 12 by means of the bolts 53. The press is then closed and the platen 60 is rotated to feed it axially until it comes into contact with the top of mold section 43. If at this time bores 72 of the platen are in registry with the tapped recesses 73 of upper mold section 43, the screws 71 may be applied to secure platen and mold section together. After the closure members 76 are applied the press is ready for operation notwithstanding the slight space between the margins of the vulcanizer shells, the lip gasket 58 being sufficient to prevent the escape of vulcanizing fluid at this point. If, however, the bores 72 are not in registry with the tapped recesses 73 of the mold section 43 when platen and mold section come into contact, the platen requires to be turned, in the direction that moves it upwardly away from the mold, until the next series of bores 72 are aligned with said recesses 73. Such turning movement of the platen cannot be greater than 45 degrees, and it will not separate the platen from the mold more than $\frac{1}{32}$ inch. The screws 71 are then applied in the manner hereinbefore noted, the tightening of said screws lifting the upper mold section slightly and drawing it into contact with the bottom face of the platen. Then, to close the mold, the gears 85 are rotated to lower the upper shell 14, and the upper mold section 43 carried thereby. Such movement of the shell also will carry the shell 14 toward the shell 12, and may completely eliminate the space originally left between the margins of said shells. The press is then ready for the vulcanizing of tires in the usual manner.

It will be understood that the operations of mounting a mold in the press are required only when replacing the mold therein with a different mold.

During vulcanization, steam is admitted to the press through the lower shell 12 by means of supply pipes 96, 96 that have connection with a suitable source of steam under pressure (not shown). The pipes 96 discharge into the chamber 13 of the vulcanizer substantially at diametrically opposite points thereof, and are so angularly positioned that the fluid streams are substantially tangential to the inner surface of the shells 12, 14. This feature is advantageous in that it sets up a circulation of the steam and assures an intimate mixing of the latter with the air initially in the vulcanizing chamber, whereby local cool spots resulting from air pockets are obviated. The chamber 13 also may be tapped by a pipe 97, Fig. 3 that constitutes a part of a pressure operated safety system (not shown).

The invention provides means for utilizing ordinary pot heater tire molds in a vulcanizing press of the watchcase type. The invention makes possible the securing of accurate registry of the mold sections, it assures that the mold will fully close, and it achieves the other advantages set out in the foregoing statement of objects.

Modification may be resorted to without departing from the spirit of the invention or the scope thereof as defined by the appended claims.

What is claimed is:

1. In a vulcanizing press of the character described the combination of a stationary shell section and a shell section movable relatively thereof to open and close the press, said shell sections enclosing a vulcanizing chamber, means including a movable cross-head to which the movable shell section is attached for so moving the latter, means by which said shell section is attached to the cross-head so as to be adjustable to vary the distance between the cross-head and the movable shell section, a mold section fixedly secured to one of said shell sections interiorly of the latter, a mating mold section, and a platen to which said mating mold section is secured, said platen having a single centrally located threaded engagement with and being located inside the other of said shell section.

2. A vulcanizing press as defined in claim 1 including means for rotating the platen, which means is accessible exteriorly of the press while the press is closed.

3. A vulcanizing press as defined in claim 1 wherein the means securing the mating mold section to the platen is accessible exteriorly of the press while the press is closed.

4. In a vulcanizing press of the character described, the combination of a stationary shell section and a shell section movable relatively thereof to open and close the press, said shell sections enclosing a vulcanizing chamber, means including a cross-head for so moving said movable shell section, means for axially adjusting the position of said movable section relatively of said cross-head, a mold section fixedly secured to the stationary shell section interiorly of the latter, a mating mold section and a platen to which said mating mold section is secured, said platen having a single threaded engagement with and located inside of the movable shell section.

5. A combination as defined in claim 4 wherein the movable shell section is formed within the vulcanizing chamber with an externally threaded axial boss, and the platen is threaded onto said boss.

6. A vulcanizing press of the character described comprising a pair of relatively movable shell sections enclosing a vulcanizing chamber, means for fixedly securing a mold section to one of said shell sections within the vulcanizing chamber, and means for adjustably securing a mating mold section to the other of said shell sections, said last mentioned means comprising an axial boss on the shell section, and an annular platen threaded onto said boss, said mating mold section being secured to said platen.

7. A combination as defined in claim 6 including means for rotating the platen, which means is accessible exteriorly of the press when the press is closed.

8. A combination as defined in claim 6 including a gear on the periphery of the platen, a pinion meshed with said gear, and a shaft on which said pinion is mounted, said shaft extending through the wall of the shell section that carries the platen.

9. A vulcanizing press of the character described comprising a pair of relatively movable shell members enclosing a vulcanizing chamber, means for fixedly securing one section of a two part mold to one of said shell sections within the vulcanizing chamber, means for adjustably securing the other section of the mold to the other of said shell sections, which means comprises an exteriorly threaded axial boss on the shell section, an annular platen threaded onto said boss, said mold section being bolted to said platen, a peripheral gear formed on the platen, a shrouded pinion meshed with said gear, and a shaft on which said pinion is mounted, said shaft being journaled for axial and angular movement in the wall of the shell section whereby it may move axially to compensate for axial movement of the platen as the latter is turned upon its threaded supporting boss.

10. A vulcanizing press of the character described comprising a pair of relatively movable shell members enclosing a vulcanizing chamber, a mold comprising a pair of mating sections, means for fixedly securing one mold section to one of said shell sections within said chamber, and means for adjustably securing the other mold section to the other shell section, said last mentioned means including a rotatable platen having threaded engagement with the shell section, and a plurality of screws extending through apertures in the platen and threaded into the mold section, said screws being elongated and extending through respective apertures in the shell section to enable them to be manipulated from the exterior of the press.

11. A combination as defined in claim 10 wherein the number of screw-apertures in the platen is a multiple of the number of screws employed to enable the mold section and platen to be secured together at a number of different angular positions of the latter.

12. A combination as defined in claim 10 including closure members mounted upon the shell section over the outer ends of the screws to prevent the escape of vulcanizing fluid from the vulcanizing chamber.

LESLIE E. SODERQUIST.